United States Patent
Krecioch et al.

(10) Patent No.: US 12,437,595 B2
(45) Date of Patent: Oct. 7, 2025

(54) SYSTEM AND METHOD FOR MODIFYING USER ACCESS RIGHTS BASED ON AN ACCESS CONTROL TRIPLET

(71) Applicant: MOTOROLA SOLUTIONS, INC., Chicago, IL (US)

(72) Inventors: Lukasz Krecioch, Chocznia (PL); Lukasz Kusa, Cracow (PL); Lukasz Gogacz, Cracow (PL); Lukasz Lesny, Gostyn (PL); Adam Stanek, Nowy Sacz (PL); Francesco Costanzo, Wawrzenczyce (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 71 days.

(21) Appl. No.: 18/544,693

(22) Filed: Dec. 19, 2023

(65) Prior Publication Data
US 2025/0201045 A1 Jun. 19, 2025

(51) Int. Cl.
*G07C 9/27* (2020.01)
*G06K 19/06* (2006.01)
(Continued)

(52) U.S. Cl.
CPC ......... *G07C 9/27* (2020.01); *G06K 19/06037* (2013.01); *G06K 19/0723* (2013.01);
(Continued)

(58) Field of Classification Search
CPC .................................... G07C 9/27; G07C 9/10
See application file for complete search history.

(56) References Cited

U.S. PATENT DOCUMENTS

| 5,886,634 A | * | 3/1999 | Muhme | G08B 13/2454 340/5.31 |
| 7,005,985 B1 | * | 2/2006 | Steeves | G06K 7/10108 340/5.2 |

(Continued)

FOREIGN PATENT DOCUMENTS

| CN | 107134029 A | 9/2017 |
| CN | 107945333 A | 4/2018 |

(Continued)

OTHER PUBLICATIONS

The International Search Report and the Written Opinion, corresponding patent application No. PCT/US2024/058338 filed Dec. 4, 2024, mailed: Mar. 4, 2025, all pages.

*Primary Examiner* — Nabil H Syed (57) ABSTRACT

Techniques for modifying user access rights are provided. Access rights of the user are retrieved from an access control system token associated with the user. Access rights of a piece of equipment currently being operated by the user are retrieved from an access control system token associated with the piece of equipment. Access rights of a temporary token currently associated with the piece of equipment are retrieved from an access control system token associated with temporary token. The access rights of the user, the piece of equipment, and the temporary token currently associated with the equipment are combined to create an access control triplet. It is determined if the user is allowed to pass through an access control point based on the access control triplet.

14 Claims, 6 Drawing Sheets

(51) Int. Cl.
  *G06K 19/07*  (2006.01)
  *G07C 9/00*  (2020.01)
  *G07C 9/10*  (2020.01)
  *G07C 9/28*  (2020.01)

(52) U.S. Cl.
  CPC .......... *G07C 9/00182* (2013.01); *G07C 9/10* (2020.01); *G07C 9/28* (2020.01)

(56) References Cited

U.S. PATENT DOCUMENTS

| | | | |
|---|---|---|---|
| 2008/0079580 A1* | 4/2008 | Shelton ................. | G07C 9/29 |
| | | | 340/572.1 |
| 2019/0287326 A1* | 9/2019 | Dautz .................... | G07C 9/28 |
| 2021/0256070 A1 | 8/2021 | Tran et al. | |

FOREIGN PATENT DOCUMENTS

| | | |
|---|---|---|
| CN | 111898942 A | 11/2020 |
| CN | 108369755 B | 3/2022 |
| WO | 2016150532 A1 | 9/2016 |

\* cited by examiner

SYSTEM AND METHOD FOR MODIFYING USER ACCESS RIGHTS BASED ON AN ACCESS CONTROL TRIPLET

BACKGROUND

Access control systems are valuable to protect the resources of an organization by ensuring that only authorized people are granted access based on defined access rights. For example, in a commercial enterprise, access to a facility may be controlled by an access control system consisting of a door that remains locked until some form of access credential is presented. The access credential may be in the form of a badge, such as a Radio Frequency (RF) ID badge. The user may present the RFID badge to a reader located near the door. The access control system may check to see if the user who was issued this access credential has access rights to the facility. If so, the door may be given a command to unlock and allow the user to enter. Access control systems may also make use of biometric identifiers (e.g. fingerprints, iris scans, palm print, etc.). Use of biometrics protects against access credentials being stolen.

In a somewhat more recent development, the access credential may be in the form of an application running on a user device, such as a smartphone. Using near field communications (NFC), when a user approached an access control point, the application on the user device may transmit information to the reader located near the door. If the access control system determines the user has sufficient access rights, the user may be allowed to pass through the access control point.

The access control system may provide a granular level of control over which enterprise users are allowed to access which portions of the facility. For example, all employees may be allowed to enter the main entrance of a building upon providing proper access credentials. However, certain areas of the building (e.g. laboratories, areas where hazardous materials are stored, confidential areas, etc.) may have access restricted to a subset of employees. The access control system is configured to store access rights for each user so that it can provide/restrict access.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIGS. 2(A-C) are example use cases that may utilize the techniques described herein.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Although access control systems may allow a user access to a certain area, in some cases, the user having access rights to that area may be a necessary, but not sufficient condition for granting the user access. There may be other criteria that need to be met prior to granting access. For example, consider a warehouse where there may be certain portions restricted to forklift traffic (e.g. pedestrians not allowed). A forklift operator may have access to such areas due to the nature of their job function.

A problem may arise if only the forklift operator's credential is used to access the restricted area. For example, the forklift operator may approach the access control point and present his credentials that indicate he is a forklift operator. However, the forklift operator may currently be on foot and is not operating a forklift. As such, access to the restricted area should be denied, even though the user's access credentials allow access.

A further problem may arise in that there may be temporary associations of access credentials with a piece of equipment. For example, a particular load on a pallet may have access credentials. When the pallet is being carried by a forklift, the temporary access credentials may also be a factor in determining if access is granted. For example, consider a shipping dock of the warehouse whose access should be restricted to forklifts carrying pallets that contain items to be shipped (e.g. there should be no need for an empty forklift to be entering the shipping area, etc.).

The techniques described herein solve these problems, and others, individually and collectively. An access control triplet is created based on three factors. The first factor is access rights of the user based on an access control system token associated with the user. Such a token may include a device such as a smartphone, an RFID badge, or any other such token.

The second factor is access rights of a piece of equipment being operated by the user. These access rights may be retrieved from an access control token that is associated with the piece of equipment. Such a token may include an RFID tag, a Quick Response (QR) code, a Bluetooth Low Energy (BLE) beacon, etc. The user may pair their own access control system token with the token of the piece of equipment to prove they are operating the equipment. For example, the user may scan a QR code of the equipment (e.g. forklift, etc.) once they begin operating it the equipment. This pairing may periodically expire and require renewal to ensure the user is still operating the equipment. In the case of an active pairing, such as with BLE, the pairing may be disrupted if the user moves too far away from the equipment.

The third factor may be a temporary token that is currently associated with the piece of equipment. For example, a temporary token may be attached to a pallet of goods. The temporary token may include attributes about the contents on the pallet (e.g. size, weight, contents, hazardous material indicator, etc.). When a piece of equipment (e.g. forklift, etc.) interacts with the temporary token, the temporary token is associated with the piece of equipment.

The three factors are combined to create an access control triplet. The access control triplet is then used to determine if the access control system will allow access. Continuing with the warehouse example, assume the path to a shipping area is restricted to forklift operators, currently operating a forklift, carrying a load destined for shipping. A user (e.g. forklift operator) may associate his access control system token with that of the forklift he is currently operating. The user may then also associate the temporary token of a pallet of goods (e.g. goods destined for shipping, etc.) with the piece of equipment. When the user approaches the access control point protecting the shipping area, the access control triplet is presented to a reader at the access control point. The access control system may then allow or deny access based on the triplet.

A method of modifying user access rights is provided. The method comprises retrieving access rights of the user from an access control system token associated with the user. The method also comprises retrieving access rights of a piece of equipment currently being operated by the user from an access control system token associated with the piece of equipment. The method also comprises retrieving access rights of a temporary token currently associated with the piece of equipment from an access control system token associated with the temporary token. The method also comprises combining the access rights of the user, the piece of equipment, and the temporary token currently associated with the equipment to create a access control triplet. The method also comprises determining if the user is allowed to pass through an access control point based on the access control triplet.

In one aspect, the method further comprises periodically verifying the access control triplet is still valid. In one aspect of the method, the access control token associated with the user is a smartphone. In one aspect of the method, the access control token associated with the piece of equipment and the access control token associated with the temporary token are at least on of an Radio Frequency ID (RFID) tag and a Quick Response (QR) code.

In one aspect, the method further comprises invalidating the access control token associated with the temporary token currently associated with the piece of equipment when the temporary token has arrived at a terminal destination. In one aspect of the method, the access control token associated with the temporary token currently associated with the piece of equipment includes metadata related to characteristics of a load currently being transported by the piece of equipment. In one aspect of the method, an allowed path through an area is determined based on the access control triplet.

A system for modifying user access rights is provided. The system comprises a processor and a memory coupled to the processor. The memory containing a set of instructions thereon that when executed by the processor cause the processor to retrieve access rights of the user from an access control system token associated with the user. The instructions on the memory also cause the processor to retrieve access rights of a piece of equipment currently being operated by the user from an access control system token associated with the piece of equipment. The instructions on the memory also cause the processor to retrieve access rights of a temporary token currently associated with the piece of equipment from an access control system token associated with the temporary token. The instructions on the memory also cause the processor to combine the access rights of the user, the piece of equipment, and the temporary token currently associated with the equipment to create a access control triplet. The instructions on the memory also cause the processor to determine if the user is allowed to pass through an access control point based on the access control triplet.

In one aspect of the system, the instructions on the memory further cause the processor to periodically verify the access control triplet is still valid. In one aspect of the system, the access control token associated with the user is a smartphone. In one aspect of the system, the access control token associated with the piece of equipment and the access control token associated with the temporary token are at least on of an Radio Frequency ID (RFID) tag and a Quick Response (QR) code.

In one aspect of the system, the instructions on the memory further cause the processor to invalidate the access control token associated with the temporary token currently associated with the piece of equipment when the temporary token has arrived at a terminal destination. In one aspect of the system, the access control token associated with the temporary token currently associated with the piece of equipment includes metadata related to characteristics of a load currently being transported by the piece of equipment. In one aspect of the system, an allowed path through an area is determined based on the access control triplet.

A non-transitory processor readable medium containing a set of instructions thereon is provided. The instructions on the medium, that when executed by a processor, cause the processor to retrieve access rights of the user from an access control system token associated with the user. The instructions on the medium further cause the processor to retrieve access rights of a piece of equipment currently being operated by the user from an access control system token associated with the piece of equipment. The instructions on the medium further cause the processor to retrieve access rights of a temporary token currently associated with the piece of equipment from an access control system token associated with the temporary token. The instructions on the medium further cause the processor to combine the access rights of the user, the piece of equipment, and the temporary token currently associated with the equipment to create a access control triplet. The instructions on the medium further cause the processor to determine if the user is allowed to pass through an access control point based on the access control triplet.

In one aspect, the instructions on the medium further cause the processor to periodically verify the access control triplet is still valid. In one aspect of the medium, the access control token associated with the user is a smartphone. In one aspect of the medium, the access control token associated with the piece of equipment and the access control token associated with the temporary token are at least on of an Radio Frequency ID (RFID) tag and a Quick Response (QR) code.

In one aspect, the instructions on the medium further cause the processor to invalidate the access control token associated with the temporary token currently associated with the piece of equipment when the temporary token has arrived at a terminal destination. In one aspect of the medium, an allowed path through an area is determined based on the access control triplet.

Each of the above-mentioned embodiments will be discussed in more detail below, starting with example system in which the embodiments may be practiced, followed by an illustration of processing blocks for achieving an improved technical method, device, and system for modifying user access rights based on an access control triplet, and concluding with architectures of device(s) which may implement the system.

Further advantages and features consistent with this disclosure will be set forth in the following detailed description, with reference to the figures.

Figure 1:
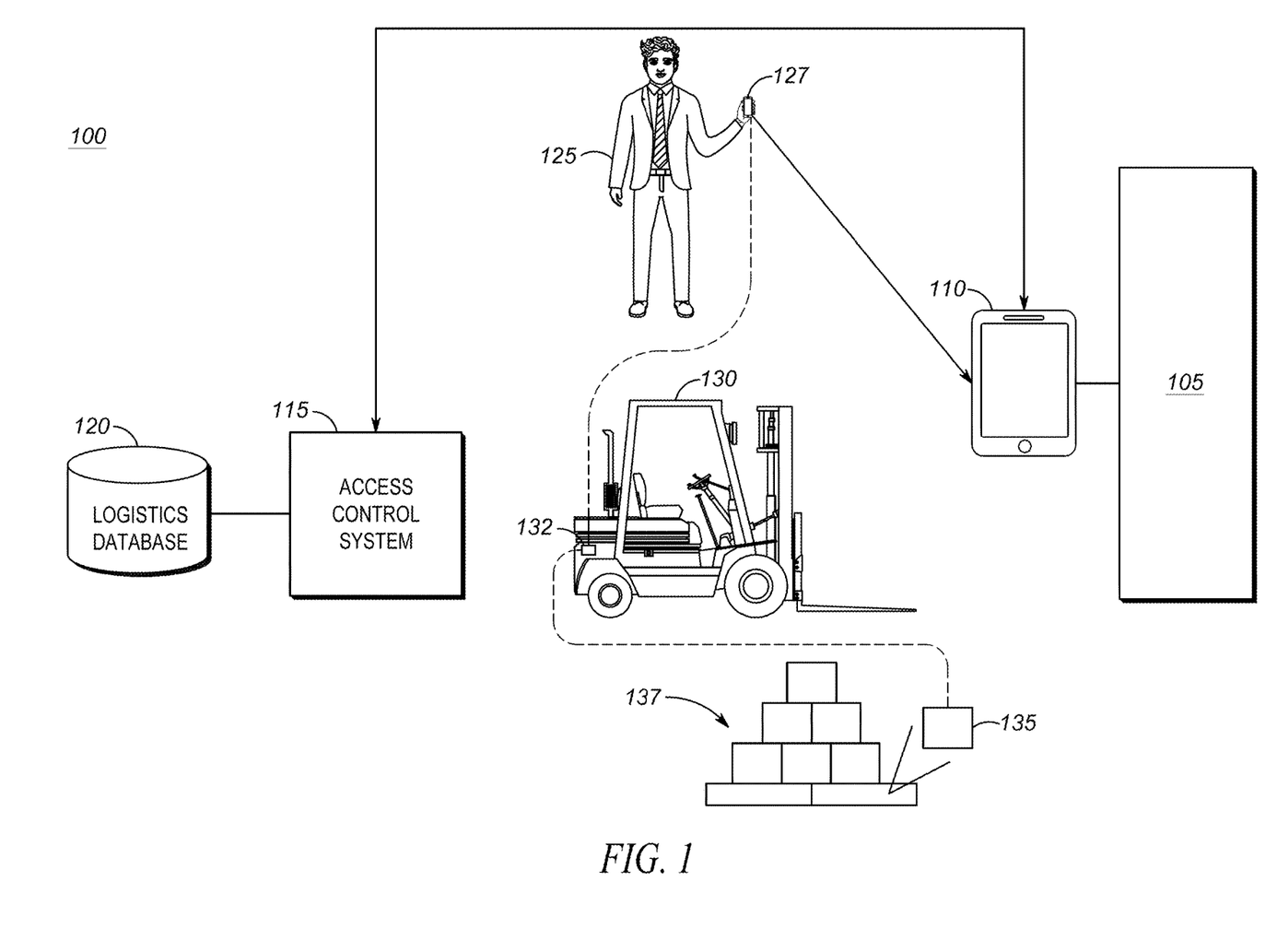
FIG. 1 is an example environment in which the techniques described herein may be implemented.

FIG. 1 is an example environment 100 in which the techniques described herein may be implemented. The environment includes an access control point 105, an access control reader 110, an access control system 115, and a logistics database 120. The environment also includes a user 125, a piece of equipment 130, and a temporary token 135. The access control point may be any type of device that allows access to an area to be restricted. Some examples of access control points can include doors, gates, mantraps, retractable bollards, etc. The particular form of the access control point is relatively unimportant. What should be understood is that the access control point is of a type that can be controlled by an access control system to allow/deny access to a user 125 based on their access rights. The form of an access control point may be dependent on the intended users/equipment. For example, access control points for users on foot may typically be devices such as electronically lockable doors and turnstiles. Access control points for vehicles may include gates and retractable bollards.

The access control point 105 may be coupled to an access control reader 110. The access control reader is a device communicatively coupled to the access control point and the access control system 115. The access control reader receives an access control token from a user device 127. As will be explained in further detail below, in some implementations of the techniques described herein, the access control reader will receive an access control triplet from the user device. The access control reader may come in many forms. In some examples, the access control reader may be an RFID badge reader. In other example implementations, the access control reader may be a reader configured to communicate via some form of NFC (e.g. BLE, RFID, etc.) with an electronic device associated with a user (e.g. smartphone, tablet, phablet, etc.).

The access control reader 110 may be coupled to an access control system 115. An example of a device that may implement an access control system is described with respect to FIG. 4. The access control system may receive access token(s) from the access control reader. In some cases, the access control system may receive the access control triplet directly from the access control reader. In other implementations, the access control system may combine tokens received from the user 125, the equipment 130, and the temporary token 135 to create an access control triplet. Based on the access control triplet, the access control system may determine if the user is allowed access via the access control point.

Environment 100 includes a user 125. Although a single user is shown, it should be understood that this is for ease of description only, and not by way of limitation. The user is associated with an access control system token 127. In some implementations, the access control system token is a device, such as a smartphone, that is associated with the user. The device may be capable of communicating with other access control system tokens to be used when creating access control triplets. For example, the device may be equipped with a camera that is able to read and decode QR codes. The device may be equipped with NFC in order to wirelessly communicate with other access control system tokens.

Environment 100 may also include equipment 130. Although FIG. 1 depicts the equipment as a forklift, it should be understood that this is for purposes of description only. Although only a single piece of equipment is depicted, it should be understood that this is for purposes of ease of description, rather than by way of limitation. Furthermore, although a forklift is depicted, the techniques described herein are not limited to forklifts. What should be understood is that the equipment is any type of equipment that may be operated by the user 125 (e.g. pallet jack, hospital bed, firearm, etc.).

Equipment 130 may be have an access control system token 132 associated with it. The access control system token associated with the equipment may include parameters associated with the equipment (e.g. operational, requires maintenance, etc.). The access control system token associated with the equipment may be a QR code that is readable by device 127. The token may also be a RFID tag that can be read by the device via NFC. The particular form of the token is relatively unimportant, so long as the token is such that it can be used in creating an access control triplet.

Environment 100 also includes temporary token 135. The temporary token is an access control system token that is temporarily (e.g. not permanently) associated with the piece of equipment 130. For example, the temporary token may be applied to a pallet (e.g. a load on the pallet) 137. The temporary token may include data related to the load. For example, the temporary token may include information that allows data about the load (e.g. size, weight, destination, contents, etc.) to be retrieved from a logistics database 120. When the forklift picks up the pallet, the temporary token becomes associated with the piece of equipment. The temporary token is then used in the creation of the access control triplet to determine if access via the access control point 105 is allowed.

In operation, a user 125 may wish to access an area protected by access control point 105. For example, assume that the access control point is protecting the shipping dock of a warehouse. For purposes of this example, assume that access via the access control point is limited to those users who are certified forklift operators, currently operating a forklift, and that the forklift is currently carrying a load that is destined for the shipping dock.

The user 125 may then use his device (e.g. smartphone, etc.) 127 to pair with a piece of equipment 130, which in this case is a forklift. In one example, implementation, the forklift may contain there on a token 132, such as a QR code. The user may scan this QR code with their device. In another implementation, the token on the equipment may be a Bluetooth device, and the user device and the token on the equipment may form a pair. In yet another implementation, the token on the equipment may be an RFID tag and the user device utilizes NFC to gather access credentials from the forklift.

It should be understood that the particular techniques for associating the piece of equipment 130 with the user 125 are relatively unimportant. What should be understood is that the association shows that the user is currently operating the piece of equipment. In some cases, this may be enforced by the nature of the connection. For example, in the case of a Bluetooth pairing, if the user moves too far away from the piece of equipment, the connection is lost, and it can be determined the user is no longer associated with the piece of equipment. In other cases, the pairing between the user and the equipment may be time limited. For example, the association may expire after some period of time (e.g. thirty minutes, one hour, etc.) after which the user must re-associate with the equipment. What should be understood is that the system is able to determine if the user is currently associated with the piece of equipment.

The user 125 may then use the equipment 130 to pick up a load. In this example, the load is a pallet 137 containing goods. The load may include a temporary token 135 which includes access rights that will temporarily be associated with the piece of equipment. For example, the pallet may have attached a temporary token which may include data about the contents of the pallet (e.g. identifier, contents, size, weight, dimensions, etc.). When the piece of equipment is used to move the pallet, the temporary token is associated with the piece of equipment.

The temporary token 135 can be similar to the token 132 associated with the piece of equipment 130. For example, the token 135 may be a QR code, an RFID tag, a Bluetooth tag, etc. Upon picking up the load, the user 125 may utilize their device 127 to associate the temporary token with the user device and the piece of equipment. Just as above, association may be enforced based on distance between the temporary token and the piece of equipment (e.g. in terms of a Bluetooth token) or may be time based.

Once the user 125 has operated the equipment 130 to pick up the load 137, the equipment may be maneuvered to access control point 105. The user token 127, the equipment token 132, and the temporary token 135 may then be combined to create an access control triplet. In some implementations, the user device may simply provide the user token 127, the equipment token 132, and the temporary token 135 to an access control reader 110. The access control reader may then send those tokens to an access control system 115. In other cases, the user device may be used to create the access control triplet and provide it to the access control reader. What should be understood is that regardless of where created, the access control triplet is a representation of the combination of the user, the equipment, and the temporary token.

The access control system 115 may utilize the access control tokens to determine if access through the access control point should be granted. For example, the access control system may first determine if the user 125 is authorized to enter. For example, the access control system may check to see that the user is classified as a certified forklift operator, and as such should have access rights consistent with a forklift operator.

The access control system may then check that the user 125 is currently operating a forklift 130. If the user is operating some other type of equipment, this would indicate that they should not be given access via the access control point 105. Finally, the access control system may determine from the temporary token 135 if the piece of equipment is currently associated with the something that has appropriate access rights to traverse the access control point. In this example, temporary token may be associated with a pallet being carried by the piece of equipment. The access control system may access a logistics database 120 to determine characteristics of the contents of the pallet. For example, the logistics system may determine that the contents of the pallet are destined for the shipping dock.

After determining that the combination of the user 125, the equipment 130, and the temporary token 135 (e.g. the access control triplet) meets the criteria for traversing the access control point 105 (e.g. certified forklift operator, currently operating a forklift, carrying a load destined for shipping dock, etc.), the access control system may then command the access control point to allow the user to traverse the access control point. What should be understood is that if any of the three criteria are not met, the access control point will not allow the user to traverse the access control point. Furthermore, it should be understood that the access control triplet is based on the current association. For example, a user could not associate with a piece of equipment earlier in the day, and have that association persist, even after they are no longer operating the equipment. The techniques described above ensure that the association between the user, the equipment, and the temporary token remain current.

Figure 2A:
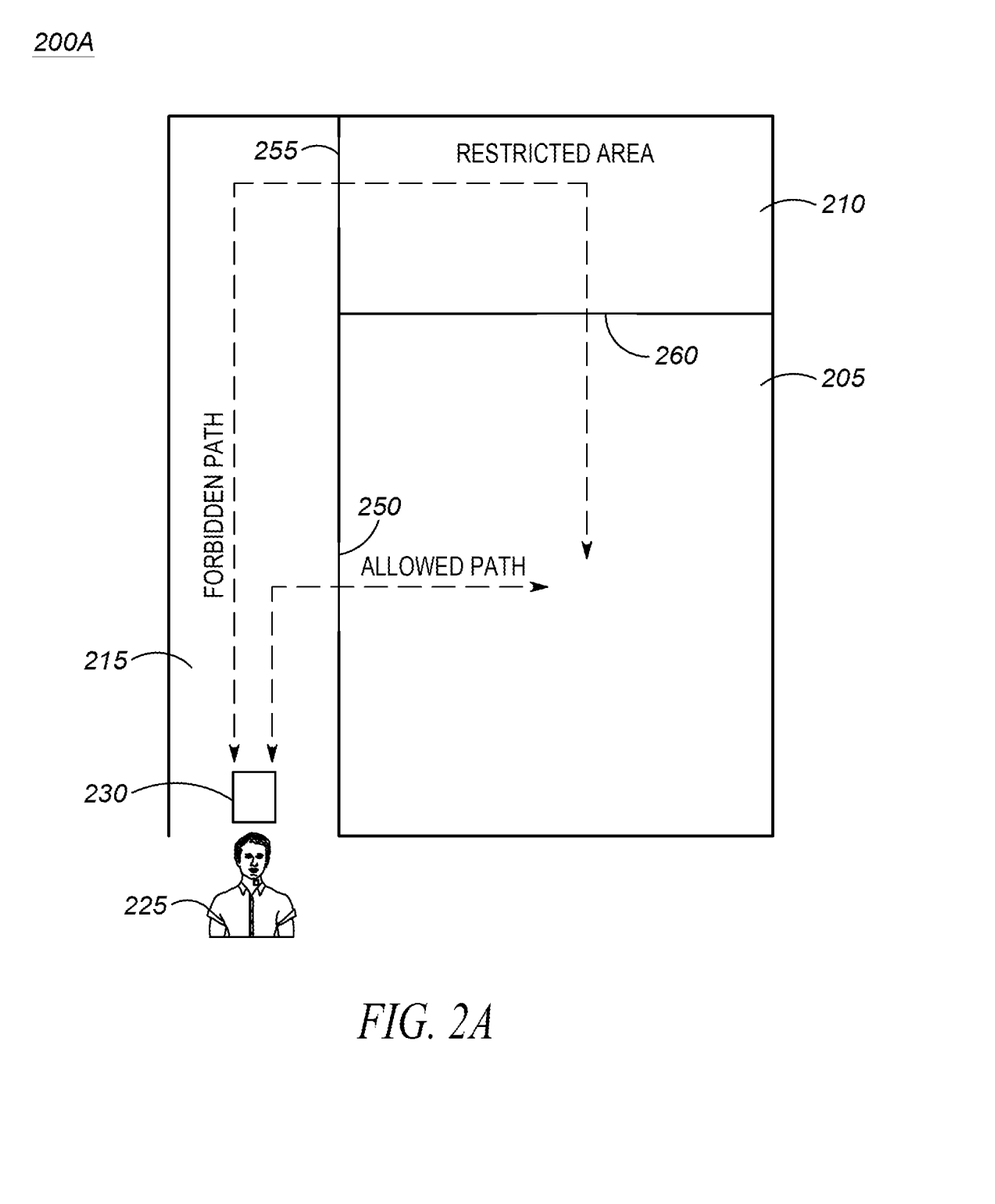
Figure 2B:
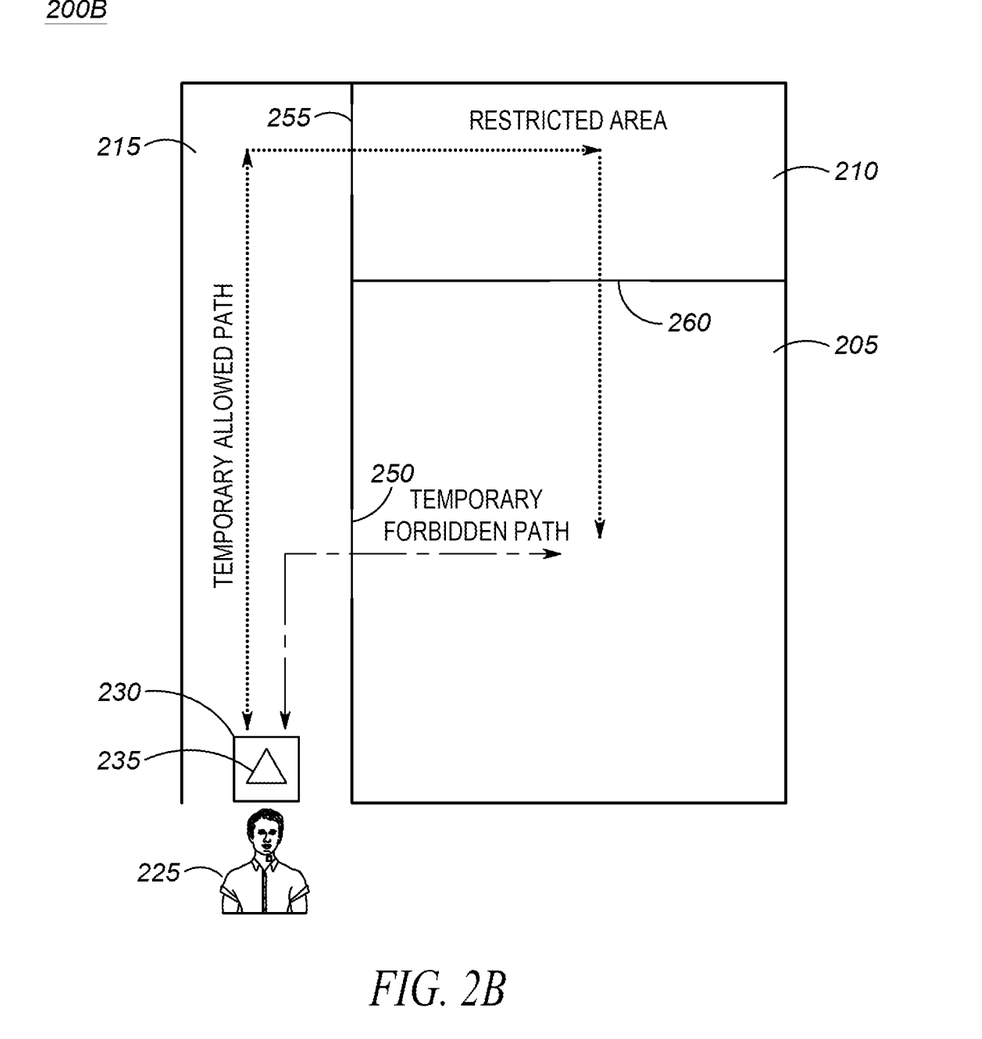
Figure 2C:
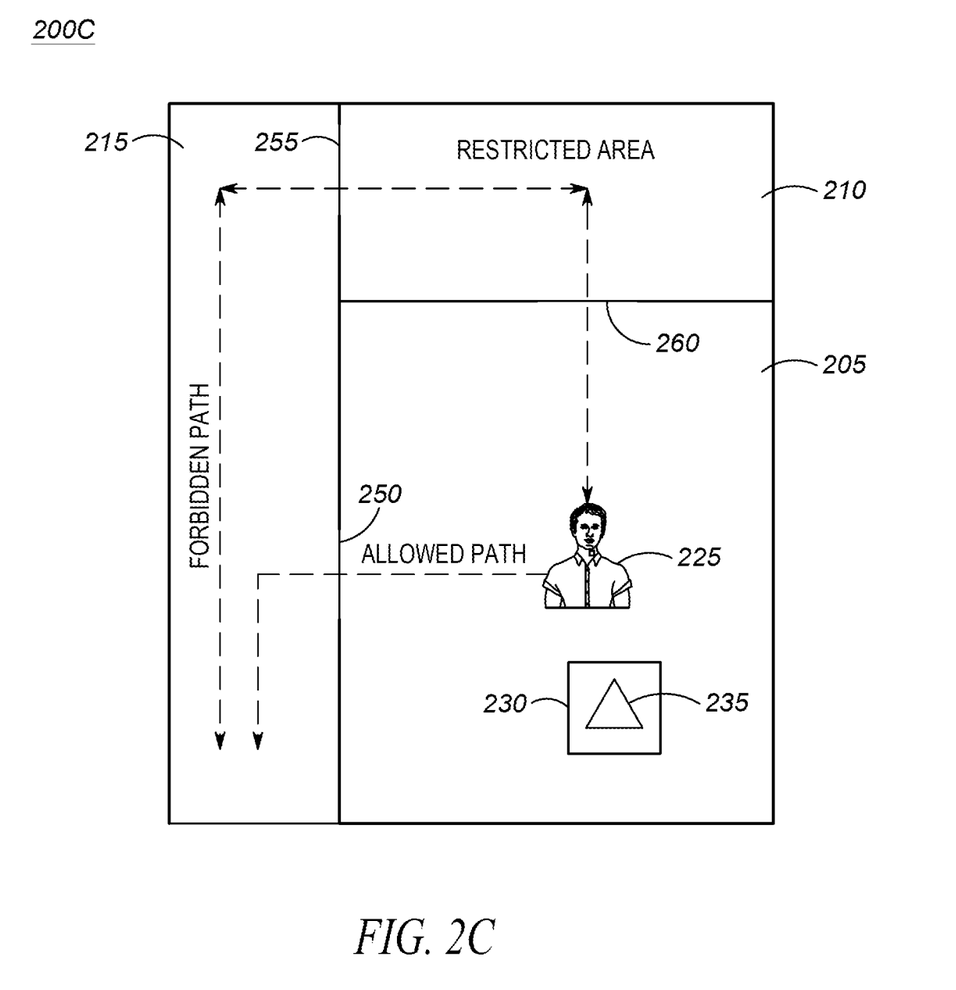

FIGS. 2(A-C) are example use cases that may utilize the techniques described herein. FIG. 2A depicts an area 200A that includes an unrestricted area 205, a restricted area 210, and a hallway 215. FIG. 2A also includes an access control point 250 leading from the hallway to the unrestricted area, an access control point 255 leading from the hallway to the restricted area, and an access control point 260 between the unrestricted and restricted area. For purposes of this example use case, the criteria to enter the restricted area that the user is a certified forklift operator, operating a forklift, currently carrying a wide load. The criteria to enter the unrestricted area from the hallway may be the user is operating a forklift and is not currently carrying a load.

As shown in FIG. 2A, there is a user 225 operating a forklift 230 in hallway 215. The forklift is not currently carrying a load, and as such is not associated with a temporary token. If the user attempts to access the unrestricted area 205 through access control point 250, the access is allowed because the criteria (authorized user, operating correct equipment, with no load) is satisfied. As such, traversing the access control point 250 is an allowed action and that path is deemed an allowed path.

On the other hand, if the user 225 attempts to take the forklift 230 through access control point 255, that request will be denied. The reason for the denial being that although the user is a forklift driver, currently driving a forklift, the forklift is not currently associated with a temporary token indicating that a wide load is being carried.

FIG. 2B depicts an area 200B that is very similar to that described with respect to FIG. 2A. The difference in this case is that the forklift 230 is currently associated with a temporary token 235. In this example, assume that the temporary token indicates that the load being carried is an oversized load. As described above, criteria for traversing access control point 250 from the hallway 215 is that the user is certified to operate a forklift, is currently operating a forklift, and is not carrying a wide load. As should be clear, given the association of the wide load temporary token 235 with the forklift, the criteria are no longer met. As such, what was previously an allowed path, has now become a temporarily forbidden path. On the other hand, what was previously a forbidden path through access control point 255 has now become a temporary allowed path.

FIG. 2C depicts an area 200C that is similar to FIG. 2B, with the exception that the user 225, has taken the forklift 230, with the temporary token 235 into the unrestricted area 205 via access control points 255 and access control point 260. Assume that the criteria for traversing access control point 260 from the restricted area 210 to the unrestricted area are the same as for traversing access control point 255 from the hallway 215. It should further be understood that the access control criteria may be dependent on the direction of access control point traversal. For example, the criteria to enter the unrestricted area from the hallway may be the user is forklift certified, operating a forklift, and is not currently associated with a temporary token that indicates the forklift is associated with a wide load. The criteria to exit the unrestricted area may be that the user is not associated with a forklift, or the forklift is not associated with a temporary token indicating any type of load at all (i.e. materials are not allowed to leave the unrestricted area).

Once the user 225 has dropped of the materials associated with the temporary token 235, the temporary token may become inactive. For example, if the unrestricted area 205 is the destination for these materials, the materials should not be allowed to leave the area. As such, the user is allowed to return to the hallway 215 via access control point 250 either on foot or on the forklift, but is not allowed to leave if still associated with the temporary token. Thus, the path through access control point 250 becomes the allowed path.

Likewise, the criteria to traverse access control point 260 from the unrestricted area to the restricted area may be that the user 225 is associated with a forklift 230 that is temporarily associated with a token 235 that indicates the forklift is carrying a wide load. Because the material associated with the forklift has been dropped off in the unrestricted area, the temporary token is no longer valid. As such, if the user attempts to traverse access control point 260 from the unrestricted area, the attempt will be rejected because the temporary token is no longer valid. Thus, the path that was allowed for the user to enter the unrestricted area has now become the forbidden path.

Although the previous examples have been in terms of a user operating a forklift carrying a pallet of goods, it should be understood that the techniques are not so limited. What should be understood is that the techniques are applicable anywhere that there is a user operating a piece of equipment and that equipment is associated with a temporary token. For example, consider a hospital worker (e.g. user) pushing a hospital bed (e.g. equipment) with a patient currently laying in the bed (temporary token). Depending on the status of the patient, that may determine where in the hospital the worker pushing the bed is allowed to go.

In yet another case, the access control triplet may be used to limit the allowable paths to force the equipment to go to a certain area. For example, consider a forklift that is due for maintenance and should not be operated for any other purposes prior to the maintenance. A temporary token so indicating could be associated with the forklift. Any attempt to maneuver the forklift to any location other than the place where maintenance can be performed may be denied. In other words, the access control triplet would be such that all paths that do not lead to the maintenance department are forbidden paths.

The access control triplet can also be used to protect the equipment and load. For example, there may be certain paths where the equipment or load should not be allowed. For example, consider a narrow passage where a forklift could not turn around, or an area with a rough traveling surface that could potentially damage a load. Even if the user is allowed to enter such an area on foot, the access control triplet may prevent entry base on the type of equipment being operated and the load being carried The techniques can further be used to ensure that a load is being transported using appropriate equipment. For example, a fragile load may need to be transported using a hand pulled pallet jack (e.g. not a forklift). If the access control triplet is created while the load is on a forklift, access may be denied because of the potential harm to the load.

In some cases, the access control triplet may be used to control access even when nothing is being transported. For example, a prison security guard (e.g. user) may be equipped with a firearm (e.g. equipment). There may be certain access points the security guard is not allowed to traverse due to the presence of the firearm. For example, the guard would typically not be allowed in proximity of the inmates while armed over a concern that the guard may have the firearm taken away from him. However, special circumstances may arise where the guard should be allowed to carry the firearm. A temporary token may be associated with the firearm related to the special condition (e.g. hostage scenario). The access control triplet may then allow the guard access via the access control point due to the temporary token, when otherwise access would not be allowed.

Figure 3:
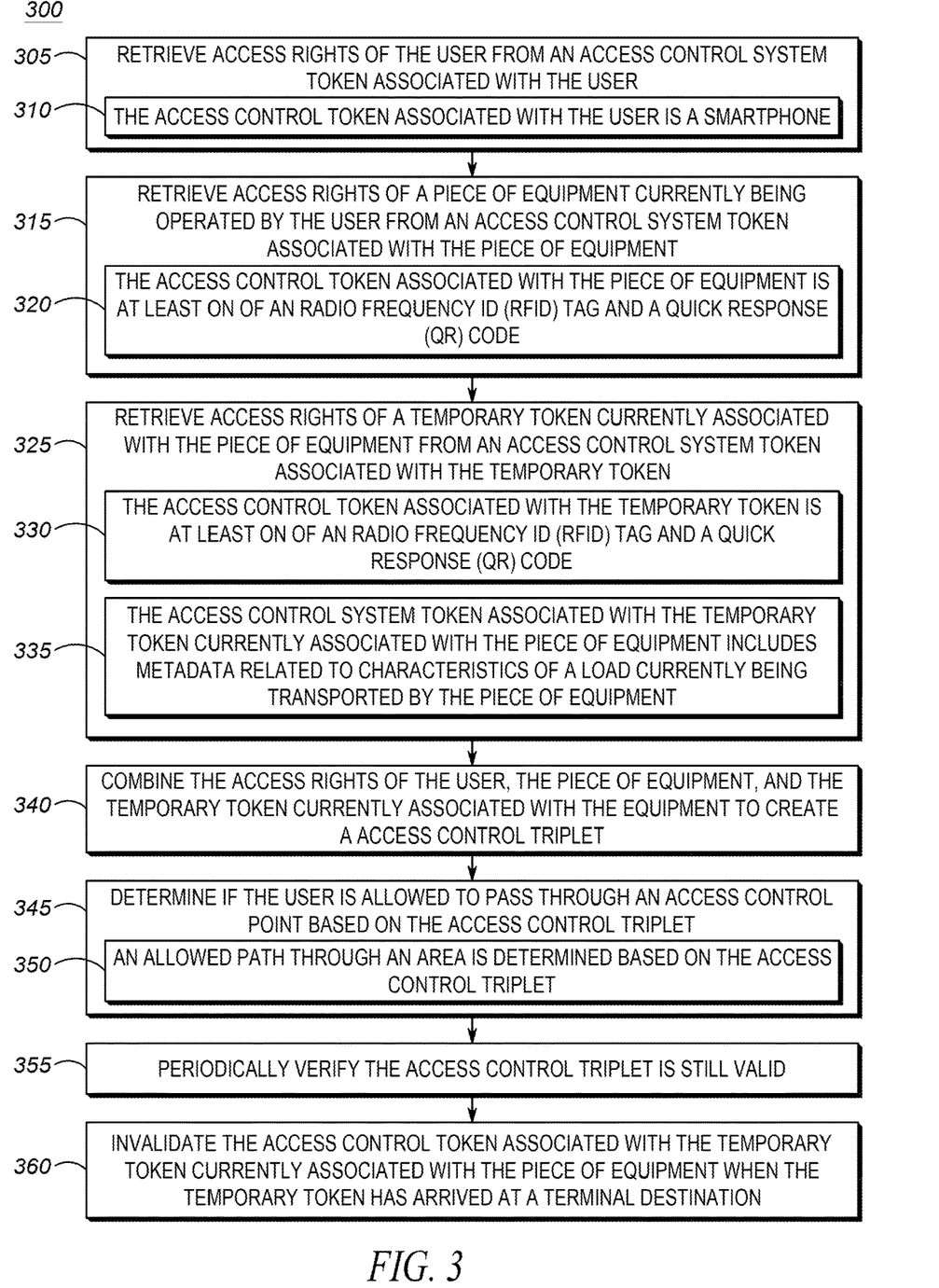
FIG. 3 is an example flow chart describing an implementation of the techniques described herein.

FIG. 3 is an example flow chart 300 describing an implementation of the techniques described herein. In block 305, access rights of the user are retrieved from an access control system token associated with the user. In many implementations, the access control system token associated with the user will be a device, such as a smartphone. However, the access control system token could be any other type of token. For example, an RFID tag readable via NFC, a Bluetooth token, etc. Regardless of the particular form the access control system token associated with the user determines the access rights of the user through any access control point. In block 310, the access control token associated with the user is a smartphone.

In block 315, the access rights of a piece of equipment currently being operated by the user are retrieved from an access control system token associated with the piece of equipment. In the case where the user access control system token is a smartphone, the access control system token associated with the piece of equipment may be a Bluetooth device that pairs with the smartphone. Although the techniques described herein are not so limited. In the case of wireless pairing, such as via Bluetooth, if the user is not in sufficiently close proximity to the piece of equipment, the pairing may fail. As such, the user may no longer be considered to be operating the piece of equipment.

In block 320, the access control system token associated with the piece of equipment is at least one of an RFID tag and a quick response code. As mentioned before, although a Bluetooth pairing may be utilized, such a pairing may require that the token be provided with a source of power. Another form of pairing could include the users token (e.g. smartphone) reading a tag such as an RFID tag or a QR code that is affixed to the piece of equipment. In the case of an RFID tag, the proximity of the user device communicating with the tag via NFC is indicative that the user is still currently operating the piece of equipment. In the case of a QR code, the association me periodically expire, requiring that the code be scanned again to confirm the user is still operating the piece of equipment.

In block 325, access rights of a temporary token currently associated with the piece of equipment are retrieved from an access control system token associated with the temporary token. As explained above, the piece of equipment may at times be associated with additional access rights based on a transitory condition. For example, in the case of a forklift, the temporary token may be associated with the load that is being carried. In the case of a hospital bed, the temporary token may be associated with the patient currently in that bed. What should be understood is that there is not a permanent association between the temporary token and the piece of equipment.

In bock 330, just as with block 320, the temporary token currently associated with the piece of equipment is at least one of an RFID tag and a quick response code. The description of block 320 is equally applicable here. In block 335, the access control token associated with the temporary token currently associated with the piece of equipment includes metadata related to characteristics of a load currently being transported by the piece of equipment. As described above, in some cases where the piece of equipment is used to transport a load, the temporary token may represent data about that load. This data may include contents of the load, size, weight, dimensions, patient name, patient disease, etc. What should be understood is that access rights may be determined, based in part, on what the piece of equipment is currently being used to transport.

In block 340, the access rights of the user, the piece of equipment, and the temporary token currently associated with the equipment is combined to create a access control triplet. The access control triple represents the access control rights for this particular combination of user, equipment, and things temporarily associated with the equipment. In some cases, the access control triplet may be created by the user access device (e.g. smartphone, etc.). In other implementations, the access control triplet may be created by the access control system based on the user token, the equipment token, and the temporary token.

In block 345, it is determined if the user is allowed to pass through an access control point based on the access control triplet. As explained above, each access control point may have criteria for user operating equipment to traverse the access control point. The access control triple represents the particular combination of access control rights for the user, equipment, and temporary token.

In block 350, an allowed path through an area is determined based on the access control triplet. As explained above, a path may traverse multiple access control points. If a particular access control triplet allows access via one access point, but then traps the user because no other access points along the path permit access based on the access control triplet, then this is a forbidden path. An allowed path is determined by ensuring that all access control points along the path will allow traversal, given the particular access control triplet that is being presented.

In block 355, the validity of the access control triplet is periodically verified. As explained above, if the user is no longer operating the equipment or if the temporary token is no longer associated with the piece of equipment, the access control triplet is no longer valid. To ensure validity, the access control token is periodically verified to ensure the proper conditions, which may have existed previously, are still in effect. AS described above, the verification can be done by ensuring wireless connections between the access tokens still exist (e.g. within defined proximity, etc.). In other implementations, the access control triplet may periodically expire, requiring the user to renew the association between the user, the equipment, and the temporary token.

In block 360, the access control token associated with the temporary token currently associated with the piece of equipment is invalidated when the temporary token has arrived at a terminal destination. For example, once a load has arrived where it needs to go, the temporary token may be invalidated, thus preventing the load from moving outside the designated area. This may be useful from preventing someone from taking something that has properly been sent to the correct location and putting it in a different location.

Figure 4:
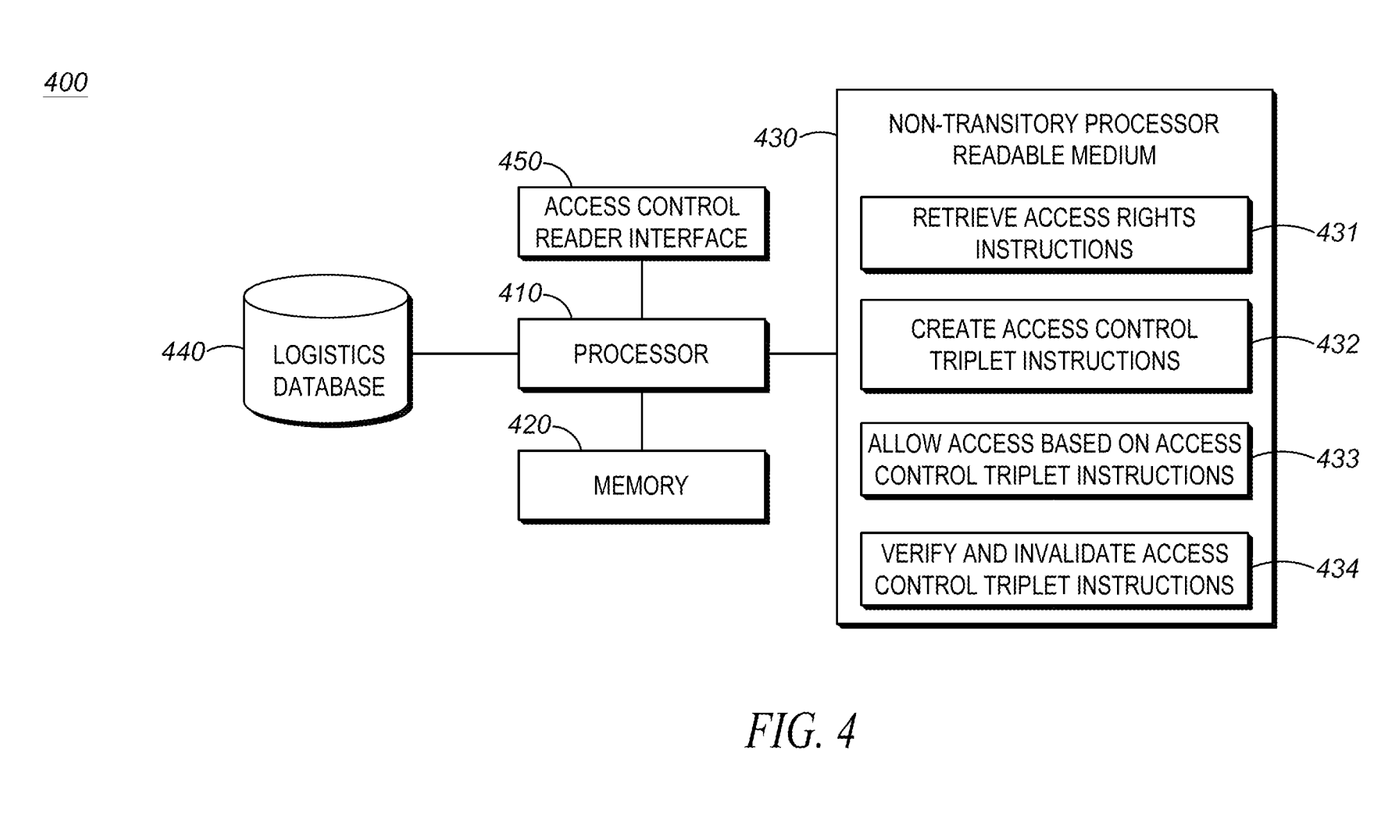
FIG. 4 is an example of a device that may implement the techniques described herein.

FIG. 4 is an example of a device 400 that may implement the techniques described herein. It should be understood that FIG. 4 represents one example implementation of a computing device that utilizes the techniques described herein. Although only a single processor is shown, it would be readily understood that a person of skill in the art would recognize that distributed implementations are also possible. For example, the various pieces of functionality described above (e.g. access criteria retrieval, access control triplet creation, etc.) could be implemented on multiple devices that are communicatively coupled. FIG. 4 is not intended to imply that all the functionality described above must be implemented on a single device.

Device 400 may include processor 410, memory 420, non-transitory processor readable medium 430, logistics database 440, and access control reader interface 450.

Processor 410 may be coupled to memory 420. Memory 420 may store a set of instructions that when executed by processor 410 cause processor 410 to implement the techniques described herein. Processor 410 may cause memory 420 to load a set of processor executable instructions from non-transitory processor readable medium 430. Non-transitory processor readable medium 430 may contain a set of instructions thereon that when executed by processor 410 cause the processor to implement the various techniques described herein.

For example, medium 430 may include retrieve access rights instructions 431. The retrieve access rights instructions 431 may cause the processor to retrieve the access rights associated with a user, a piece of equipment being operated by the user, and a temporary token associated with the piece of equipment. The temporary token may be associated with access rights that are stored in a logistics database 440. The access rights associated with the user and the equipment and the temporary token may be received from the access control reader via an access control reader interface 450. The retrieve access rights instructions 431 are described throughout the specification generally, including places such as the descriptions of blocks 305-335.

The medium 430 may include create access control triplet instructions 432. The create access control triplet instructions 432 may cause the processor to combine the previously retrieved access rights into an access control triplet that is used to determine if access via an access control point is granted. The create access control triplet instructions 432 are described throughout the specification generally, including places such as the descriptions of block 340.

The medium 430 may include allow access based on access control triplet instructions 433. The allow access based on access control triplet instructions 433 may cause the processor to utilize the access control triplet to determine if access should be allowed or not. When it is determined that access is to be allowed, the processor may utilize the access control reader interface 450 to command the access control reader to allow access via the access control point. The allow access based on access control triplet instructions 433 are described throughout the specification generally, including places such as the descriptions of blocks 345 and 350.

The medium 430 may include verify and invalidate access control triplet instructions 434. The verify and invalidate access control triplet instructions 434 may cause the processor to periodically verify the access control triplet to ensure the conditions are currently being met. For example, that the user is still operating the piece of equipment and that the temporary token is still associated with the piece of equipment. If not, the access control triplet is invalidated. The verify and invalidate access control triplet instructions 434 are described throughout the specification generally, including places such as the descriptions of blocks 355 and 360.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (Saas), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot communicate with an access control reader to retrieve access rights and combine them to form an access control triplet, which is used to control an access control point, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of modifying user access rights comprising:
   retrieving access rights of the user from an access control system token associated with the user;
   retrieving access rights of a piece of equipment currently being operated by the user from an access control system token associated with the piece of equipment;
   retrieving access rights of a temporary token currently associated with the piece of equipment from an access control system token associated with the temporary token;
   combining the access rights of the user, the piece of equipment, and the temporary token currently associated with the equipment to create a access control triplet;
   determining if the user is allowed to pass through an access control point based on the access control triplet;
   periodically expiring the access control triplet;
   periodically verifying the access control triplet is still valid; and
   invalidating the access control token associated with the temporary token currently associated with the piece of equipment when the temporary token has arrived at a terminal destination.

2. The method of claim 1 wherein the access control token associated with the user is a smartphone.

3. The method of claim 1 wherein the access control token associated with the piece of equipment and the access control token associated with the temporary token are at least on of an Radio Frequency ID (RFID) tag and a Quick Response (QR) code.

4. The method of claim 1 wherein the access control token associated with the temporary token currently associated with the piece of equipment includes metadata related to characteristics of a load currently being transported by the piece of equipment.

5. The method of claim 1 wherein an allowed path through an area is determined based on the access control triplet.

6. A system for modifying user access rights comprising:
   a processor; and
   a memory coupled to the processor, the memory containing a set of instructions thereon that when executed by the processor cause the processor to:

retrieve access rights of the user from an access control system token associated with the user;

retrieve access rights of a piece of equipment currently being operated by the user from an access control system token associated with the piece of equipment;

retrieve access rights of a temporary token currently associated with the piece of equipment from an access control system token associated with the temporary token;

combine the access rights of the user, the piece of equipment, and the temporary token currently associated with the equipment to create a access control triplet;

determine if the user is allowed to pass through an access control point based on the access control triplet;

periodically expire the access control triplet;

periodically verify the access control triplet is still valid; and invalidate the access control token associated with the temporary token currently associated with the piece of equipment when the temporary token has arrived at a terminal destination.

7. The system of claim 6 wherein the access control token associated with the user is a smartphone.

8. The system of claim 6 wherein the access control token associated with the piece of equipment and the access control token associated with the temporary token are at least on of an Radio Frequency ID (RFID) tag and a Quick Response (QR) code.

9. The system of claim 6 wherein the access control token associated with the temporary token currently associated with the piece of equipment includes metadata related to characteristics of a load currently being transported by the piece of equipment.

10. The system of claim 6 wherein an allowed path through an area is determined based on the access control triplet.

11. A non-transitory processor readable medium for modifying user access rights, containing a set of instructions thereon that when executed by a processor cause the processor to:

retrieve access rights of the user from an access control system token associated with the user;

retrieve access rights of a piece of equipment currently being operated by the user from an access control system token associated with the piece of equipment;

retrieve access rights of a temporary token currently associated with the piece of equipment from an access control system token associated with the temporary token;

combine the access rights of the user, the piece of equipment, and the temporary token currently associated with the equipment to create a access control triplet;

determine if the user is allowed to pass through an access control point based on the access control triplet;

periodically expire the access control triplet;

periodically verify the access control triplet is still valid; and invalidate the access control token associated with the temporary token currently associated with the piece of equipment when the temporary token has arrived at a terminal destination.

12. The medium of claim 11 wherein the access control token associated with the user is a smartphone.

13. The medium of claim 11 wherein the access control token associated with the piece of equipment and the access control token associated with the temporary token are at least on of an Radio Frequency ID (RFID) tag and a Quick Response (QR) code.

14. The medium of claim 11 wherein an allowed path through an area is determined based on the access control triplet.

* * * * *